United States Patent [19]

Osburn

[11] Patent Number: 5,153,431

[45] Date of Patent: Oct. 6, 1992

[54] WELL LOGGING RADIOACTIVE DETECTOR ASSEMBLY

[75] Inventor: Terry D. Osburn, Arlington, Tex.

[73] Assignee: Computalog Research, Inc., Ft. Worth, Tex.

[21] Appl. No.: 837,583

[22] Filed: Feb. 18, 1992

Related U.S. Application Data

[63] Continuation of Ser. No. 682,093, Apr. 5, 1991, abandoned.

[51] Int. Cl.⁵ .............................................. G01V 5/04
[52] U.S. Cl. ..................................... 250/267; 250/268
[58] Field of Search ........... 250/267, 269, 270, 390.01, 250/239, 370.15, 261, 374, 370.01, 268; 378/161

[56] References Cited

U.S. PATENT DOCUMENTS

| | | | |
|---|---|---|---|
| 3,254,221 | 5/1966 | Saurenman | 250/268 |
| 3,521,063 | 7/1970 | Tittman | 250/268 |
| 3,978,939 | 9/1976 | Trouiller | 250/268 |
| 4,492,865 | 1/1985 | Murphy et al. | 250/265 |
| 4,504,736 | 3/1985 | Smith, Jr. et al. | 250/256 |
| 4,629,888 | 12/1986 | Wolk | 250/267 |
| 4,694,166 | 9/1987 | Gearhart | 250/261 |
| 4,707,607 | 11/1987 | Whetten | 250/385.1 |
| 4,717,825 | 1/1988 | Smith, Jr. et al. | 250/256 |
| 4,825,073 | 4/1989 | Smith, Jr. et al. | 250/260 |
| 4,939,361 | 7/1990 | Smith, Jr. et al. | 250/260 |

Primary Examiner—Carolyn E. Fields
Assistant Examiner—Drew A. Dunn
Attorney, Agent, or Firm—James E. Bradley

[57] ABSTRACT

A radioactive energy detector for well logging utilizes a Dewar flask. The Dewar flask has an inner housing containing a gamma ray detector. An outer housing surrounds the inner housing, with the annular clearance being evacuated. A window section is integrally formed in the side wall of the outer housing. The window section has a wall thickness that is less than the wall thickness of the side wall of the outer housing. The outer housing is constructed of a material of relatively low atomic number.

2 Claims, 1 Drawing Sheet

WELL LOGGING RADIOACTIVE DETECTOR ASSEMBLY

This application is a continuation, of application Ser. No. 682,093, filed Apr. 5, 1991, now abandoned.

BACKGROUND OF THE INVENTION

1. Field of the Invention

This invention relates in general to well logging radioactive detecting equipment, and in particular to a Dewar flask for containing the detector, the Dewar flask having a window of low gamma ray attenuation.

2. Description of the Prior Art

One type of means of logging a well is by the use of a radioactive source. An instrument is lowered into the well containing a radioactive source and a gamma ray detector. The source emits radioactive energy into the formation of the earth. Gamma rays occurring as a result of the emission of the radioactive energy will be detected by the detector. The rate of gamma rays detected can be used to determine characteristics of the formation, such as the density.

One type of detector operates better at temperatures lower than those encountered in a well. A well bore may be at several hundred degrees, while the detector may operate better at normal ambient conditions at the surface. A Dewar flask is used to contain the detector to maintain it as near as possible at ambient surface temperatures. The Dewar flask has inner and outer containers separated by a space. The space is evacuated for insulation.

Incoming gamma rays must pass through both the inner and outer housings before reaching the detector. For accurate reading, the inner and outer housings should have as low of attenuation as possible. They should be as transparent to gamma rays as possible so as to not capture any low energy gamma rays that otherwise would reach the detector.

In one prior art type, a window will be located adjacent the detector. This window is made up of a material such as beryllium that has a low Z (atomic number) material. A low Z material will transmit low energy gamma rays better than a high Z material. The remaining portions of the outer housing of the flask are made up of a high Z material. The two different materials required sealing at the junctions. The windows of the prior art type are expensive and difficult to fabricate. The outer housing of the flask has to be fairly sturdy to withstand collapsing due to the vacuum contained within the outer housing.

SUMMARY OF THE INVENTION

In this invention, the detector housing has a window section formed in the sidewall housing adjacent the detector. The window section is of the same material as the remaining portions of the outer housing. However, the window section has a thinner wall thickness than the wall thickness of the sidewall of the outer housing.

The thinner section is formed by milling, etching, or other conventional processes. The thinner wall section enhances the passage of the gamma rays to the detector.

DETAILED DESCRIPTION OF THE INVENTION

Figure 1:
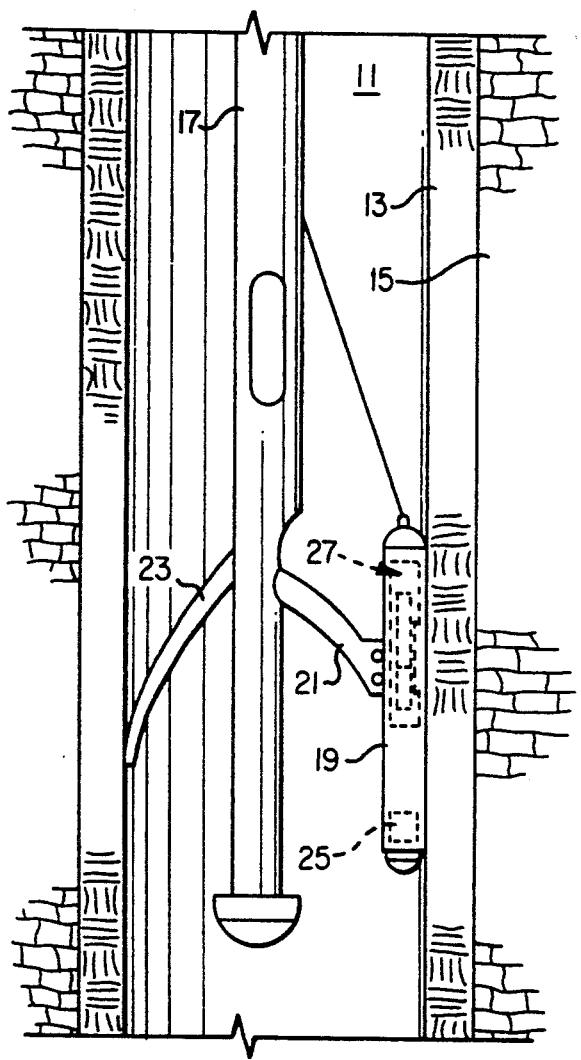
FIG. 1 is a schematic side view illustrating a radioactive well logging instrument located in a well and having a detector assembly constructed in accordance with this invention.

Referring to FIG. 1, well 11 has a well bore that is coated with a mud cake 13. Mud cake 13 is coated on the formation 15 during drilling of the well.

Logging instrument 17 is lowered on a conductor cable (not shown). Logging instrument 17 has a sub 19 containing measurement equipment. Sub 19 mounts to a linkage member 21 that when energized will push the sub 19 out against the mud cake 13. An arm 23 located on the opposite side from sub 19 maintains pressure to keep the sub 19 against the bore hole wall.

A radioactive source 25 locates in the sub 19. Source 25 will emit radioactive energy, such as gamma rays, into the earth formation 15. The radioactive energy will interact in the earth formation 15 and cause gamma rays to travel out of the formation 15, through the mud cake 13 and into the bore of well 11.

A detector assembly 27 mounts above the source 25. The detector assembly 27 will detect a portion of the gamma rays. The rate of detection is transmitted to the surface over the conductor cable. Characteristics of the formation, such as the density, can be determined from the gamma rays. The technique described above is conventional.

Figure 2:
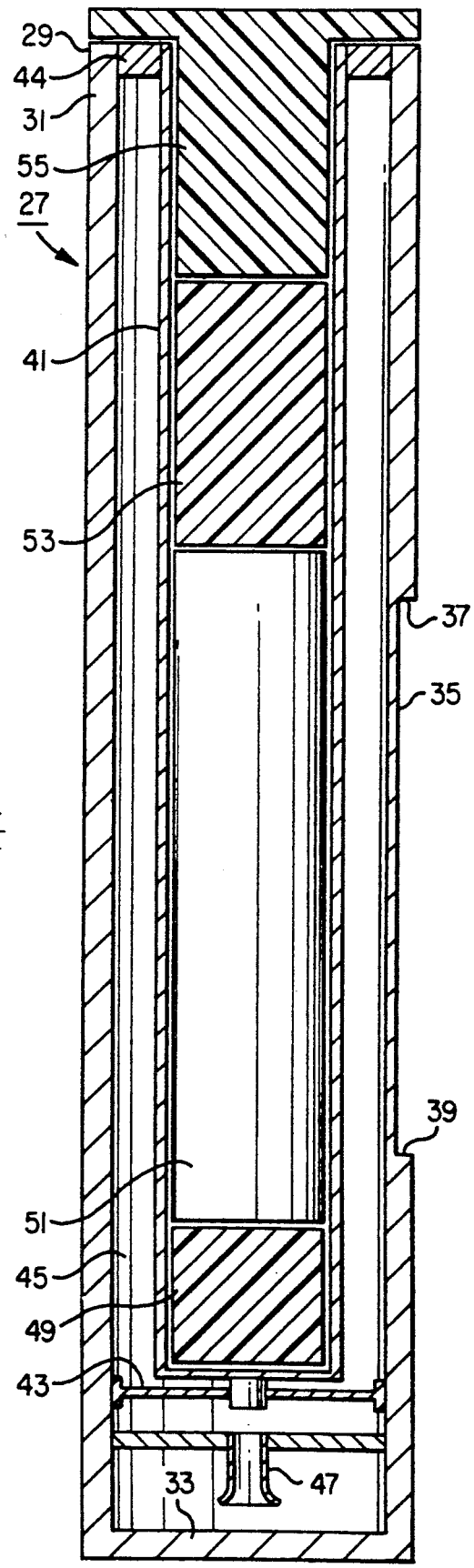
FIG. 2 is a vertical sectional view of the detector assembly of FIG. 1.

Referring to FIG. 2, detector assembly 27 includes a Dewar flask which has an outer housing 29. Outer housing 29 has a cylindrical side wall 31 and a bottom 33. A window 35 is formed in side wall 31. Window 35 is formed by milling the side wall 31 or by other techniques such as chemical edging, girding, etc. Window 35 is a section of side wall 31 that has a lesser wall thickness than the remaining portions of side wall 31. The wall thickness of side wall 31 is preferably about 0.035 inch (0.00889 mm). The wall thickness of window 35 is less than one-half, preferably about 0.012 inch (0.0305 mm).

Window 35 has an upper edge 37 and a lower edge 39. The length from the upper edge 37 to the lower edge 39 is substantially less than the overall length of the outer housing 29 from bottom 33 to the top. Window 35 has a circumferential width that is approximately 60 degrees. The width is thus considerably less than the circumference of the side wall 31. Window 35 is thus an integral portion of the outer housing side wall 31 and of the same material. The material is of low atomic number, preferably titanium.

An inner housing 41 locates inside the outer housing 29. Inner housing 41 is also cylindrical, but is substantially less in diameter. Inner housing 41 is supported on a lower support 43. A collar 44 supports inner housing 41 to the outer housing 29 at the top. An evacuation space 45 surrounds the inner housing 41. The evacuation space is evacuated through an evacuation tube 47 in a conventional manner. The evacuation space 45 serves as an insulation.

The inner housing 41 is also preferably constructed of titanium. The inner housing 41 has a side wall thickness that is approximately the same as the wall thickness of window 35. Tests have shown that about a 25 percent increase in count rate by detector 51 can be expected by reducing the wall thickness of the window 35 from 0.035 inch to 0.010 inch (0.0889 mm to 0.0254 mm).

A lower thermal storage member 49 locates in the bottom of the inner housing 41. A conventional gamma ray detector 51 mounts on the lower thermal storage member. An upper thermal storage member 53 locates on top of detector 51. A stopper 55 mounts on top of the upper thermal storage member. The window 35 has a length that is approximately the length of the region of detector 51 that will detect gamma rays.

In operation, the detector assembly 27 will be mounted in sub 19. The detector assembly 27 will be oriented such that window 35 will be located adjacent the mud cake 13 when the arm 23 and linkage member 21 are expanded outward as shown in FIG. 1. In the preferred embodiment, outer housing 29 locates in a sealed chamber in the sub 19 and is not exposed to hydrostatic fluid pressure. The vacuum between the inner and outer housings 41, 29 insulates the detector 51 and retards the temperature increase of the detector due to well temperatures.

Source 25 will emit radioactive particles. Gamma rays will travel through the mud cake 13, as a result of the emission of the radioactive particles. The gamma rays pass through the window 35 and through the side wall of the inner housing 41 to the detector 51. The gamma rays will be detected, with the count rate information being transmitted up the well through the logging cable.

The invention has significant advantages. The window increases the count rate substantially. Because the window is integrally formed with the side wall, it requires no sealing. The window is less expensive to construct than prior art housings using windows of different material than the remaining portions of the housing. The housing maintains its structural strength against pressure.

While the invention has been shown in only one of its forms, it should be apparent to those skilled in the art that it is not so limited, but is susceptible to various changes without departing from the scope of the invention.

I claim:

1. In a well logging instrument of the type having a radioactive logging sub having a sealed chamber and have a radioactive source for emitting radioactive energy into the well formation, the instrument having a radioactive energy detector for detecting gamma rays resulting from the emission of the radioactive energy into the well formation, and means for pressing the sub against the well of the well, an improved Dewar flask for the detector, comprising in combination:

an inner housing formed of titanium and containing the detector;

an outer housing formed of titanium, having a cylindrical side wall surrounding the inner housing and separated by a clearance which is evacuated, the outer housing being located within the sealed chamber in the sub of the instrument;

a window section formed in the side wall of the outer housing adjacent the detector and on a side of the side wall closest to the wall of the well when the sub is pressed against the wall of the well, the window section being of the same material as and integrally formed with the side wall of the outer housing, the window section being located only of a portion of the side wall of the outer housing that faces outward toward the closest wall of the well, the window section having a circumferential width that is less than the circumference of the side wall of the outer housing, the window section being generally rectangular and having a length less than the length of the side wall of the outer housing, the window section having a wall thickness that is less than one-half the wall thickness of the side wall of the outer housing to enhance the passage of gamma rays to the detector; and wherein the inner housing has a cylindrical side wall that is of lesser wall thickness than the wall thickness of the side wall of the outer housing other than in the window section.

2. The Dewar flask according to claim 1 wherein the circumferential width of the window section is approximately 60 degrees.

* * * * *